(12) United States Patent
Shaotran

(10) Patent No.: US 12,139,041 B2
(45) Date of Patent: Nov. 12, 2024

(54) ROUTE BASED BATTERY PRECONDITIONING SYSTEMS AND METHODS

(71) Applicant: BP PULSE FLEET NORTH AMERICA INC., Mountain View, CA (US)

(72) Inventor: Ethan Shaotran, Palo Alto, CA (US)

(73) Assignee: BP PULSE FLEET NORTH AMERICA INC., Mountain View, CA (US)

(*) Notice: Subject to any disclaimer, the term of this patent is extended or adjusted under 35 U.S.C. 154(b) by 422 days.

(21) Appl. No.: 17/365,305

(22) Filed: Jul. 1, 2021

(65) Prior Publication Data

US 2023/0001824 A1 Jan. 5, 2023

(51) Int. Cl.
*B60L 58/24* (2019.01)
*H01M 10/42* (2006.01)
*H01M 10/48* (2006.01)

(52) U.S. Cl.
CPC .......... *B60L 58/24* (2019.02); *H01M 10/425* (2013.01); *H01M 10/486* (2013.01); *B60L 2240/60* (2013.01); *H01M 2010/4271* (2013.01); *H01M 2220/20* (2013.01)

(58) Field of Classification Search
CPC .. B60L 58/24; B60L 2240/60; H01M 10/425; H01M 10/486; H01M 2010/4271; H01M 2220/20
See application file for complete search history.

(56) References Cited

U.S. PATENT DOCUMENTS

| | | | |
|---|---|---|---|
| 7,629,773 B2 | 12/2009 | Eberhard et al. | |
| 7,755,329 B2 | 7/2010 | Kohn et al. | |
| 8,336,319 B2 | 12/2012 | Johnston et al. | |
| 8,620,506 B2 | 12/2013 | Kummer et al. | |
| 9,643,510 B2 | 5/2017 | Liu | |
| 10,300,808 B2 | 5/2019 | Newman et al. | |
| 10,800,287 B2 | 10/2020 | Vallender et al. | |
| 10,870,368 B2 | 12/2020 | Ing et al. | |
| 2009/0210357 A1 | 8/2009 | Pudar et al. | |
| 2011/0241824 A1 | 10/2011 | Uesugi | |
| 2012/0106544 A1 | 5/2012 | Yousefi et al. | |

(Continued)

FOREIGN PATENT DOCUMENTS

| | | |
|---|---|---|
| EP | 2803549 A1 | 11/2014 |
| WO | 2018009448 A1 | 1/2018 |

OTHER PUBLICATIONS

International Search Report and Written Opinion for PCT Application No. PCT/US2022/035583 dated Oct. 26, 2022.

(Continued)

*Primary Examiner* — Jess Whittington
*Assistant Examiner* — Rami Nabih Bedewi
(74) *Attorney, Agent, or Firm* — Dorsey & Whitney LLP

(57) ABSTRACT

A method of preconditioning a battery of a vehicle includes determining a baseline preconditioning start time relative to an estimated time of arrival at a charging station. The method further includes analyzing a route of the vehicle to the charging station to determine a route characteristic. The method further includes modifying the baseline preconditioning start time based on the route characteristic to determine a route-based preconditioning start time.

17 Claims, 9 Drawing Sheets

(56) References Cited

U.S. PATENT DOCUMENTS

| | | | |
|---|---|---|---|
| 2014/0028254 A1 | 1/2014 | Shane et al. | |
| 2014/0125279 A1 | 5/2014 | Juhasz | |
| 2014/0326430 A1 | 11/2014 | Carpenter et al. | |
| 2015/0115895 A1 | 4/2015 | Kim | |
| 2017/0008375 A1 | 1/2017 | Blatchley et al. | |
| 2017/0246962 A1 | 8/2017 | Weber et al. | |
| 2018/0189683 A1 | 7/2018 | Newman | |
| 2019/0315232 A1* | 10/2019 | Ing | B60L 58/26 |
| 2020/0055406 A1* | 2/2020 | Vallender | B60L 58/12 |
| 2020/0076020 A1 | 3/2020 | Ogaki et al. | |
| 2020/0156499 A1 | 5/2020 | Huelz et al. | |
| 2020/0171965 A1 | 6/2020 | Ko | |
| 2020/0412160 A1 | 12/2020 | Manzoor et al. | |
| 2021/0086651 A1 | 3/2021 | Maeda et al. | |
| 2021/0143649 A1* | 5/2021 | Sherback | H02J 7/0013 |
| 2021/0276447 A1 | 9/2021 | Kumar et al. | |

OTHER PUBLICATIONS

International Search Report and Written Opinion for PCT Application No. PCT/US2022/035587 dated Oct. 26, 2022.
International Search Report and Written Opinion of PCT Application No. PCT/US2022/035578 dated Oct. 18, 2022.

\* cited by examiner

ROUTE BASED BATTERY PRECONDITIONING SYSTEMS AND METHODS

FIELD

The described embodiments relate generally to systems and techniques for preconditioning a battery of an electric vehicle.

BACKGROUND

Electric vehicles may use a battery to operate an electric motor and/or other components of the vehicle. While these operations may deplete the battery, the battery may be recharged and subsequently used to operate the components of the electric vehicle. Battery temperature may influence battery recharging. As one example, an elevated battery temperature may allow the battery to be recharged more quickly as compared with a lower battery temperature. Electric vehicles may include systems to modify battery temperature for recharging. Conventional systems may modify battery temperature based on a fixed time interval, e.g., twenty minutes before arrival, and/or other interval. There is a constant need for systems and techniques to improve electric vehicle charging and battery preconditioning.

SUMMARY

Examples of the present invention are directed to systems and methods for controlling battery preconditioning in an electric vehicle based on a route or course of travel for the vehicle.

In one example, a method of preconditioning a battery of a vehicle is disclosed. The method includes determining a baseline preconditioning start time relative to an estimated time of arrival at a charging station. The method further includes analyzing a route of the vehicle to the charging station to determine a route characteristic. The method further includes modifying the baseline preconditioning start time based on the route characteristic to determine a route-based preconditioning start time.

In another example, the route characteristic may include one or more projected conditions of the route that, when present, modify a current temperature of the battery. The one or more projected conditions may include a route elevation, a change in the route elevation, a route speed, and/or a route acceleration profile, among other conditions. In some cases, the one or more projected conditions may define a collection of primary factors that, when present, modify the current temperature of the battery. Analyzing the route may thus further include determining a value for one or more primary factors of the collection of primary factors by analyzing a secondary factor that, when present, modifies the value of the one or of the primary factors. The secondary factors may include a user speed preference, a traffic condition metric, a traffic light metric, and/or a vehicle weight, among other possible factors.

In another example, analyzing the route may further include determining route segments, serially arranged along the route, between a present vehicle location and the charging station. In turn, analyzing the route may further include determining a route characteristic for each route segment. In some cases, the route characteristic for each route segment may correspond to a projected temperature change of the battery along the respective route segment. The method may further include projecting a route-based battery temperature of the battery along the route by calculating a change from a current battery temperature for each route segment based on the respective route characteristic.

In another example, determining the route-based preconditioning start time may include comparing the projected route-based battery temperature to a target preconditioning battery temperature. Determining the route-based preconditioning start time may further include determining a route time in which the projected route-based battery temperature has a value within a threshold range of the target preconditioning battery temperature. Determining the route-based preconditioning start time may further include selecting the route time as the route-based preconditioning start time.

In some cases, determining the route-based preconditioning start time further includes determining a route time along the route in which the projected route-based battery temperature has a value in which initiating a preconditioning operation for the battery at the route time is configured to reduce a preconditioning intensity relative to a baseline preconditioning intensity associated with baseline preconditioning time. In other cases, determining the route-based preconditioning start time further includes determining a route time along the route in which the projected route-based battery temperature has a value in which initiating a preconditioning operation for the battery at the route time is configured to increase a preconditioning intensity relative to a baseline preconditioning intensity associated with baseline preconditioning time, such as may be the case where a baseline preconditioning intensity is a more moderate or low value. As described herein, the preconditioning intensity may be defined as a rate of preconditioning. While many metrics are contemplated herein, the rate of change of the battery temperature, the power draw associated with an electric-based heating/cooling system, an amount of heat supplied to or removed from the battery per unit of time, and so on may be used.

In another example, a method of developing a preconditioning plan is disclosed. The method includes determine a preconditioning start time according to any of the techniques disclosed herein. The method may further include generating a recommendation or guideline for preconditioning intensity of the vehicle during the anticipated preconditioning period. The preconditioning intensity may be calculated according to any of methods described herein. In some cases, the preconditioning intensity may be around a constant 40% intensity (which might equate to 1 degree Fahrenheit per minute) throughout the preconditioning period. This may be considered a baseline preconditioning intensity in some scenarios. In other cases, it may be advantageous to vary the preconditioning based on, as one example, the various route-based factors described herein. As one non-limiting example, using the systems and techniques described herein, during the preconditioning period, the vehicle battery may precondition at 50% intensity during a first portion of the preconditioning time period, then at 100% intensity during another portion of the preconditioning period, e.g., such as in a neighborhood area until the vehicle reaches the charger. As such, the method may further include updating the preconditioning plan periodically based on the real time battery temp and the predicted battery temp, among other factors, as described herein.

In another example, a method of preconditioning a battery of an electric vehicle is disclosed. The method includes projecting a battery temperature of the battery along a route of the vehicle between a present vehicle location and a charging station by modeling a relationship between the battery temperature and a characteristic of the route. The method further includes analyzing the projected battery temperature to determine a route-based preconditioning start time. The method further includes modifying the battery temperature to reach a target preconditioning battery temperature at the route-based preconditioning start time.

In another example, modeling the relationship between the battery temperature and a characteristic of the route comprises estimating a temperature impact from one or more projected conditions of the route that, when present, modify a current temperature of the battery. Projecting the battery temperature may further include extrapolating a route-based battery temperature along the entire route from a current temperature of the battery based on the estimated temperature impact.

In another example, the method may further include analyzing the route and determining a plurality of route segments between the present vehicle location and the charging station. Additionally, projecting the battery temperature may further include determining a temperature impact for segments of the plurality of segments. Projecting the battery temperature may further include modeling the relationship between the battery temperature and the temperature impact for the segments of the plurality of segments.

In another example, projecting the battery temperature may further include projecting a route-based battery temperature of the battery along the route by calculating a change from the current battery temperature for the route segments based on the determined temperature impact. Additionally, analyzing the projected battery temperature may further include comparing the projected route-based battery temperature to the target preconditioning battery temperature. Analyzing the projected battery temperature may further include determining a route time in which the projected route-based battery temperature has a value within a threshold range of the target preconditioning battery temperature. Further, analyzing the projected battery temperature may further include selecting the route time as the route-based preconditioning start time.

In another example, modifying the battery temperature may include increasing or decreasing the battery temperature toward the target preconditioning battery temperature. The method may further include modifying a preconditioning intensity associated with the increasing or decreasing of the battery temperature based on a comparison between a current temperature of the battery and an estimated time of arrival to charging station. Further, modifying the preconditioning intensity may be based on one or more route-based conditions or factors, as described herein. As a non-limiting illustration, modifying preconditioning may include the operation of lowering or pausing preconditioning based on a characteristic of the route, such as lowering or pausing precondition intensity while accelerating onto the highway, which may help enhance efficiency of the system. In some cases, the method may further include minimizing the preconditioning intensity by determining the route-modified preconditioning start time as a time in which the current battery temperature is closest to the target preconditioning temperature.

In another example, a vehicle is disclosed. The vehicle includes an electric motor. The vehicle further includes a battery electrically connected to the electric motor. The vehicle further includes a sensor configured to detect a battery temperature of the battery. The vehicle further includes a temperature control unit configured to alter the battery temperature. The vehicle further includes a non-transitory computer-readable media encoded with instructions which, when executed by one or more processing elements of the vehicle, cause the vehicle to analyze a route of the vehicle between a present vehicle location and a charging station to determine a route characteristic. In some cases, analyzing the route may include analyzing and/or procuring pre-stored information (e.g., topographical maps based on location, roadway layouts, and so on), as well as on-demand (e.g., Internet-available or streamable) information (e.g., real-time weather updates, traffic, and so on). The instructions further cause the vehicle to modify a baseline preconditioning start time based on the route characteristic to determine a route-based preconditioning start time.

In another example, the instructions may further cause the vehicle to project a route-based battery temperature of the battery along the route of the vehicle by modeling a relationship between the battery temperature and the route characteristic. The instructions may further cause the vehicle to determine the route-based preconditioning start time by: (i) analyzing the projected route-based battery temperature along the entire route, and (ii) selecting a route time in which the projected route-based battery temperature has a value within a threshold range of a target preconditioning battery temperature. In some cases, the instructions further cause the vehicle to, using the sensor, detect the battery temperature along the route, and compare the battery temperature to projected route-based battery temperature.

In another example, the instructions may further cause the vehicle to selectively update the route-based preconditioning start time by reassessing whether the value of the projected route-based battery temperature as the selected route time remains within the threshold range of the target preconditioning battery temperature.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
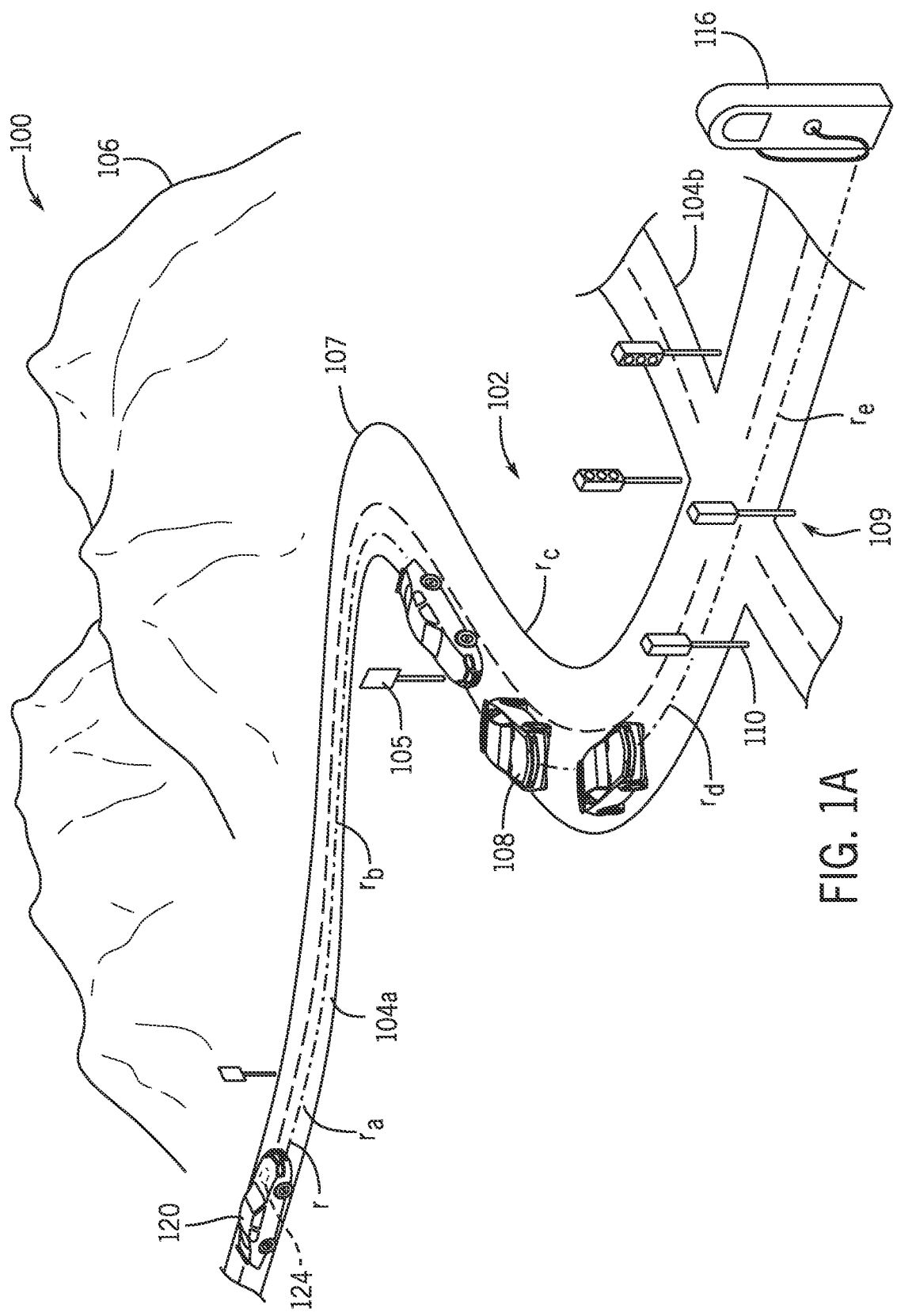
FIG. 1A depicts a schematic view of a system including vehicles traveling a route to a charging station.

The description that follows includes sample systems, methods, and apparatuses that embody various elements of the present disclosure. However, it should be understood that the described disclosure may be practiced in a variety of forms in addition to those described herein.

The following disclosure relates generally to systems and techniques for modifying the temperature of a battery in an electric vehicle. The battery may require recharging after a period of use in an electric vehicle, such as use of the battery to operate vehicle components including the electric motor. Battery temperature may influence recharging characteristics. For example, the recharging speed, recharging efficiency, and/or total accepted charge may be based, in part, on battery temperature upon arrival of the electric vehicle at a destination charging station and/or other system that is configured to recharge the battery.

In the present disclosure, modifying the temperature of a battery of an electric vehicle in preparation of battery recharging is referred to as "preconditioning." The battery temperature may be modified or preconditioned in order to cause the battery to exhibit or otherwise move toward a target preconditioning battery temperature. The target preconditioning battery temperature may be a predetermined temperature of the battery at which the battery exhibits (or is immediately capable of exhibiting) desired recharging performance, such as exhibiting a desired recharging speed and/or efficiency. However, preconditioning the battery toward the target preconditioning battery temperature may expend vehicle resources (e.g., operating a heater) and may occur over an extended period of time. Thus, preconditioning at a fixed interval (e.g., fixed time or distance) from a charging station (or precondition at a charging station itself) may produce suboptimal outcomes, including prolonged delays. Particularly where the electric vehicle is part of a fleet of coordinated or co-owned/co-operated electrical vehicles, such delays may multiply and cause substantial vehicle downtime that hinders the efficiency of the fleet.

The systems and techniques of the present disclosure may mitigate such hindrances, in part, by allowing for battery preconditioning based on the present, substantially real-time conditions of the battery and vehicle. Broadly, the present disclosure may allow for battery preconditioning based on a route or path or course of travel of the associated vehicle to a destination charging station. The route of the vehicle may include a variety of characteristics, as described herein, that may generally increase or decrease the battery temperature. The anticipated and/or actual increases and decreases in battery temperature influenced by the route may thus be analyzed in order predict battery temperature. Predicted battery temperature and associated time to a given charging station may be compared to a target preconditioning battery temperature in order to determine a preconditioning start time. Thus, rather than a fixed or standardized interval at which to initiate preconditioning, the disclosed systems and techniques may initiate preconditioning in a manner configured to minimize energy consumption, reduce vehicle downtime, and a variety of other considerations, based on the particular conditions of the route.

In one example, a method is disclosed including analyzing a route of the vehicle to the charging station in order to determine a route characteristic. The route characteristic may include one or more projected conditions of the route that, when present, modify a current temperature of the battery. Sample conditions include, without limitation, a route elevation, a change in route elevation, a number of stops along the route, a route speed limit, an expected route velocity, a route speed, a route acceleration profile, similar conditions, and combinations thereof. Such conditions may define a collection of primary factors. Example methods may include further analyzing the route in order to determine a value for the one or more of the collection of primary factors by analyzing a secondary factor that, when present, influences or modifies the value of one or more primary factors. Sample secondary factors include, without limitation, a user speed preference, a traffic condition metric, a traffic light metric, and/or a vehicle weight metric, similar factors, and combinations thereof.

Example methods may further include modifying a baseline preconditioning start time based on the determined route characteristics in order to further determine a route-based preconditioning start time. The route-based preconditioning start time may be a time along the vehicle route at which the preconditioning performance of the battery is optimized or otherwise improved from a fixed standard interval preconditioning time. As one example, a vehicle may have or operate to determine a baseline preconditioning start time, which may be representative of a fixed time or fixed distance to a destination charging station. The route-based preconditioning start time may be a time at which preconditioning the battery may result in more efficient preconditioning (e.g., lower preconditioning intensity and/or thermal energy transfer/expenditure for preconditioning), faster preconditioning, and/or less downtime at a destination charging station, among other factors.

In one example, the route-based preconditioning start time may be determined, in part, by analyzing the temperature impact of the route characteristic. For example, each of a collection of primary factors of the route characteristic, and corresponding secondary factors, may influence the temperature of the battery. The factors may be scored and weighted as appropriate. As an illustration, a first primary factor may be determined to contribute to an increase the battery temperature by 4 degrees over the route (e.g., an increase in elevation along the route), while a second primary factor may be determined to contribute to a decrease the battery temperature by 1 degree (e.g., lighter than usual anticipated traffic conditions along the route), resulting in a net expected battery temperature increase of 3 degrees due to these route conditions. The value of the temperature change may depend on the specific characteristics of the route, such as the magnitude of primary factors, as described herein. The route characteristic may in turn be associated with a temperature impact or projected battery change for the route based on the cumulative and combinative influence of the temperature impact of these and other factors.

In this regard, the route-based preconditioning start time may be determined, in part, by projecting or predicting a route-based battery temperature along the route using the projected battery temperature change. The route-based battery temperature may be compared to the target preconditioning battery in order to determine the preconditioning start time based on a variety of parameters. As one example, the preconditioning start time may be a time at which the projected route-based battery temperature has a value within a threshold range of the target preconditioning battery temperature. The threshold range may indicate, for example, that the battery temperature is closer in value to the target preconditioning battery temperature than the battery will be later along the route, thus indicating that initiating preconditioning at such time may more efficient and/or less time consuming. In other cases, other parameters may be used to determine the preconditioning start time, including parameters related to preconditioning intensity, anticipated terrain, wait time or queue at the destination charging station, and/or other conditions or parameters.

In one example, the temperature impact for the various primary and secondary factors described herein may be determined for one or more of all of a plurality of segments of a route. For example, a route may include a plurality of route segments, serially arranged along the route, between a present location of the vehicle and the charging station. A temperature impact for each segment may be determined by analyzing the impact of the primary and secondary factors for each segment. This segment-driven analysis may increase precision of the temperature impact on the battery, for example, such as where the route includes diverse conditions, including traffic congestion, steep grades, variable weather, and so on, which may be more or less controlling of the temperature impact for a given segment of the route.

As described herein, a non-transitory computer-readable media may be encoded with instructions which, when executed by one or more processing elements, cause the vehicle or remote system to perform one or more or all of the techniques described herein. In one example, a vehicle is disclosed including processing elements to execute a route-based preconditioning system. The route-based preconditioning system may operate at least partially within the vehicle to analyze the conditions of the route of the vehicle to a charging station and determine a route-based preconditioning start time. In some cases, the route-based preconditioning system may operate at least partially remote from the vehicle, such as where the preconditioning of the vehicle is controlled or influenced by a third party, including an operator of the charging station at the destination, a fleet manager, a preconditioning management service operator, and so on. In each scenario, the vehicle disclosed herein may further include a sensor to detect a current battery temperature and a temperature control unit configured to alter the temperature of the battery at the route-based preconditioning start time.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts a schematic view of a system 100 including a vehicle 120 traveling a route r to a charging station 116. The vehicle 120 may be an electric vehicle having a battery 124, as described in greater detail below with reference to FIG. 2. The vehicle 120 may be configured to perform any of the preconditioning techniques described herein using an onboard computing device and/or with a controller in electronic communication with a remote server (i.e., a server or other computing device remotely connected to the vehicle for exchanging data and other signals). In that regard, the vehicle 120 may be configured to analyze characteristics of the route r and determine a route-based preconditioning start time based on one or more characteristics of the route that may influence a temperature of the battery 124.

For purposes of illustration, the vehicle 120 is shown in the system 100. The system 100 includes various elements, conditions, scenarios, and so on which the vehicle 120 may encounter while en route to the destination charging station 116. For example, the system 100 is shown in FIG. 1A as including a roadway network 102. The roadway network 102 may include a first road 104a and second road 104b. The vehicle 120 may generally travel to the destination charging station 116 via the first road 104a of the roadway network 102, as indicated by the route r (shown in broken line). The vehicle 120, in cooperation with an onboard and/or remote computing device, may determine the route r to the destination charging station 116. For example, a navigation system or other positioning device including, without limitation, digitized maps, a global positioning system (i.e., GPS), Wi-Fi circuitry, cellular communication circuitry, another wired or wireless connection to the Internet or to a network of route calculation or fleet management devices, or the like, may be used to define the first road 104a as an appropriate road or route of the roadway network 102 for the vehicle 120 to follow in order to reach the destination charging station 116. Additionally or alternatively, components of the vehicle 120 may receive manual input that causes the vehicle 120 to define or confirm the first road 104a as the route r to the destination charging station 116. In some embodiments, the first road 104a can include multiple roads, multiple segments of interconnected roads, "off-road" trails (e.g., unpaved paths), passages across waterways via bridges, ferries, or other conveyances, or other related roadways and highways. For convenience, the "first road" as used herein refers to any number of these roads, paths, and conveyances that the vehicle 120 expects to use while traveling from an initial point to a final point (i.e., the location of the charging station 116).

The vehicle 120 may experience a variety of conditions or circumstances along the route r to the destination charging station 116 that may influence the temperature of the battery 124. The example system 100 of FIG. 1A depicts example conditions and circumstances including a speed limit 105 (symbolized by a speed limit sign next to the first road 104a), a terrain 106 (e.g., mountains or other sources of elevation changes), a curved route portion 107, traffic congestion 108 (symbolized by vehicles that are velocity-limited by the velocity, status, and course of a lead vehicle or road obstacle), an intersection 109, and a traffic signal 110. The speed limit 105 may correspond to a maximum allowable speed of the vehicle 120 along the route r. The terrain 106 may correspond to an elevation of the route r and/or a change in elevation of the route r. The traffic congestion 108 may correspond to a buildup of slow-moving vehicles along the route r. The intersection 109 may correspond to a crossing of the first and second roads 104a, 104b in the roadway network 102. The traffic signal 110 may correspond to a traffic light of the intersection and/or other traffic control device. It will be appreciated that the system 100 and roadway network 102 may include more or fewer conditions or circumstances and that the particular conditions or circumstances may depend, in part, on the determined route of the roadway network 102 to the destination charging station 116, the time of day/month/year, population demographics, and other conditions.

Each of the conditions or circumstances may influence a temperature of the battery. For example and with continued reference to FIG. 1A, the terrain 106 may cause an increase or decrease in elevation of the vehicle 124 between a first route position $r_a$ and a second route position $r_b$. In one example, the vehicle 124 may use additional power during the elevation increase from $r_a$ to $r_b$, which, in turn, may cause an increase in the temperature of the battery 124. The ambient temperature may also be different at the first route position $r_a$ (e.g., a lower elevation) as compared with the second route position $r_b$ (e.g., a higher elevation), which may also influence the temperature of the battery 124 due to heat exchange between the vehicle and the environment, due to passenger usage of HVAC which draws additional power from the battery, etc. As another example, the speed limit 105 may cause the vehicle 124 to traverse the route r at a particular speed, or within a range of speeds thereof based on user driving preferences. As the vehicle 124 continues along the route r between the second route position $r_b$ and a third route position $r_c$, the vehicle 124 may attempt to maintain or reach the speed of the speed limit 105. This activity may be associated with a temperature increase or decrease on the battery 124. The vehicle 124 may also encounter a curved route portion 107 between the second route position $r_b$ and the third route position $r_c$. Performance of the vehicle 124 in handling the curved route portion may be associated with generation of thermal energy at the battery 124 (e.g., charging the battery due to braking regeneration).

As further illustrated in FIG. 1A, the system 100 shows the traffic congestion 108 along the route r between the third route position $r_c$ and a fourth route position $r_d$. The vehicle 120 may be caused to slow during the traversal of the route between the third route position $r_c$ and the fourth route position $r_d$. In some cases, this can cause the battery to cool, such as where the vehicles 124 idles in traffic for a period of time. In some embodiments, this can cause the vehicle cabin temperature to raise, leading to greater usage of vehicle HVAC systems and a related increase in battery temperature due to that battery usage. Further, and potentially related to the traffic congestion 108, the vehicle 120 may encounter the intersection 109 along the route r between the fourth route position $r_d$ and a fifth route position $r_e$. The intersection 109 may further cause a temperature impact to the battery 124, for example, as the vehicle 120 stops (on red) and accelerates at green or on a fading yellow light.

In view of the foregoing, it will be appreciated that the temperature of the battery 124 may vary along the route r. In some cases, the temperature of the battery 124 varies substantially, increasing and decreasing, based on the conditions of the route, such as those shown in the system 100 of FIG. 1A. The temperature of the battery 124 (and temperature history of the battery) upon arrival of the vehicle 120 to the charging station 116 may thus be based on the route r. The systems and techniques of the present disclosure thus operate to determine a preconditioning start time that is configured to account for the conditions shown in FIG. 1A, and any other conditions, such that preconditioning may commence along the route at a point in which the route-based (and route-predicted) battery temperature is within a target range for preconditioning so that the battery temperature is in an optimal temperature range when charging is expected to begin and so that a minimal amount of battery energy is used for preparing the battery for the charging event.

Figure 1B:
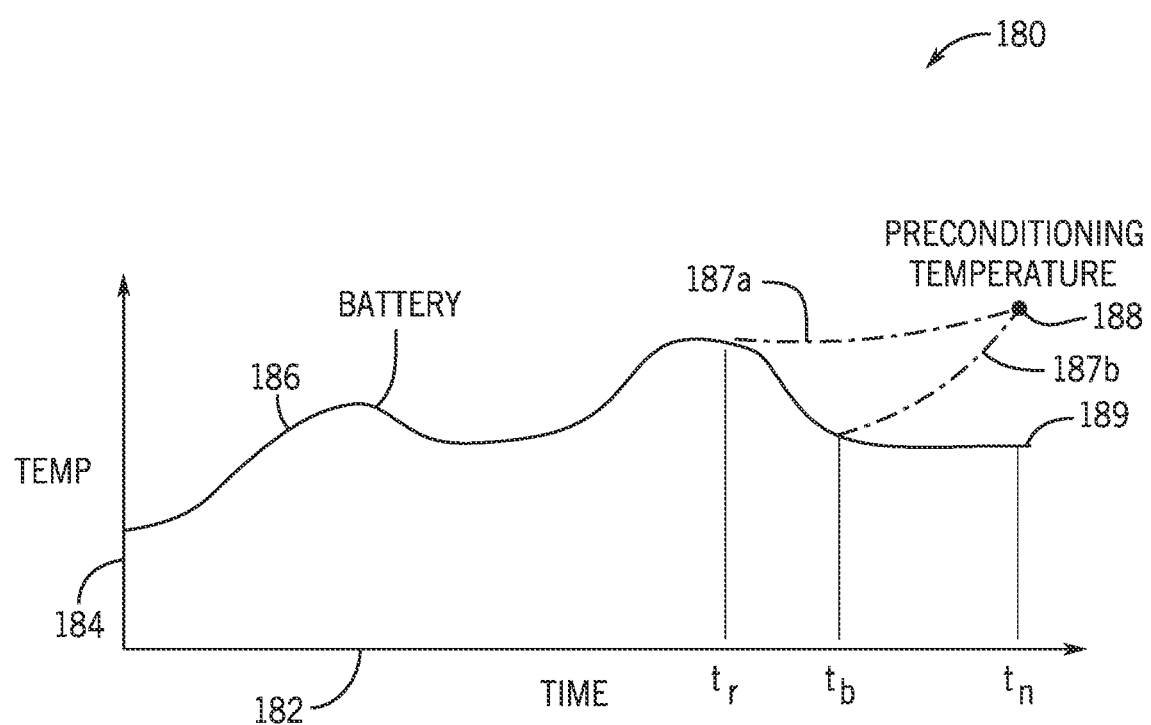
FIG. 1B depicts a sample chart representing a battery temperature of a vehicle battery of FIG. 1A along the route of FIG. 1A.

For example, and with reference to FIG. 1B, a chart 180 is depicted that represents, generally, a temperature of the battery 124 along the route r as a function of time. For example, the chart 180 includes a time axis 182 and a temperature axis 184 that generally defines an x-y coordinate system. A curve 186 is depicted that shows the temperature of the battery 124 plotted on the temperature axis 184 as a function of time of the time axis 182. As is conceptually shown in the chart 180, the temperature of the battery 124 may increase and decrease as the vehicle 120 traverses the route r. As one example, the temperature of the battery 124 may initially increase as the vehicle 120 gains elevation along the terrain 106 and then may decrease as the vehicle 120 descends in elevation, encounters slow traffic, and so on, as depicted by the curve 186. It will be appreciated that the curve 186 is depicted for purposes of example, and that the actual temperature of the battery 124 may vary more or less, or in a different manner, than the curve 186 shown in FIG. 1B.

With respect to FIG. 1B, the curve 186 is shown extending along the time axis 182 and ending generally at $t_n$ along the time axis 182. The time axis value of $t_n$ may correspond to a time at which the vehicle 120 has reached the destination charging station 116. The battery 124 may have a final temperature of 189 at $t_n$, which may correspond to a predicted or actual temperature of the battery 124 at the end of traversing the route r in the case of no preconditioning action taking place along the route r. As is shown in FIG. 1B, a preconditioning temperature 188 may be higher that the final temperature 189. In order to optimally recharge, the vehicle 120 may therefore be configured to increase the temperature of the battery 124 to reach the preconditioning temperature 188 before reaching the charging station 116. Otherwise, the vehicle 120 would need to precondition starting at $t_n$, thereby increasing downtime for the vehicle 120 as the vehicle 120 modifies the temperature of the battery 124 prior to recharging. The difference between the final temperature 189 and the preconditioning temperature 188 may also require system resources (e.g., usage of a battery heater/cooler system) that could otherwise be conserved using the systems and techniques described herein.

While FIG. 1B and various examples described herein show the preconditioning temperature as being higher than the final temperature of the battery, this is for purposes of non-limiting illustration. More generally, the preconditioning temperature may be higher or lower than a final temperature of the battery. The systems and techniques described herein may be used to analyze the route and determine a time at which to modify the battery temperature to reach the target preconditioning temperature. In this regard, where the target preconditioning temperature is higher than an anticipated final temperature of the battery, the systems and techniques may operate to determine a time at which to initiating a cooling operation of the battery. For example, a particularly hot day may be anticipated to increase a temperature of the battery beyond or above the target preconditioning temperature 188. The systems and techniques described herein may analyze the route-based factors to determine a start time at which the vehicle may begin cooling the battery to reach the lower target preconditioning temperature. In this regard, it will be appreciated that the examples described herein of increasing battery temperature are illustrations of modifying the battery temperature, and that modification of the battery temperature may include cooling the battery temperature, as contemplated herein.

For example, and as described herein, the route r may be analyzed to determine a route-based preconditioning start time $t_r$. The vehicle 120 may therefore precondition the battery along the route r before reaching the destination charging station 116 and based on the present/real-time (or substantially real-time) conditions of the battery 124. Preconditioning at the route-based preconditioning start time $t_r$ may allow for preconditioning the battery 124 when the battery 124 has a battery temperature that is closer in value to the preconditioning temperature 188. This may also allow for preconditioning of the battery with a lesser intensity, e.g., consuming fewer system resources over time to change the battery temperature. As shown in FIG. 1B, a route-based preconditioning time $t_r$ may be determined, according to any of the methods described herein. At the route-based preconditioning time $t_r$, the vehicle 120 may begin to modify the temperature of the battery 124 to approach the preconditioning temperature 188, which may be illustrated by route-based preconditioning temperature curve 187a. The temperature of the battery 124 at the route-based preconditioning start time $t_r$ is closer in value to the preconditioning temperature 188 than the temperature of the battery at $t_n$. As such, as illustrated by the curve 187a, the temperature of the battery 124 may change by a lesser amount than the battery 124 would if preconditioning where to begin at $t_n$. In other words, the battery temperature is kept more steady from time $t_r$ to time $t_n$, so preconditioning is less resource-intensive than if preconditioning began at time $t_n$ or at a baseline preconditioning time $t_b$, as explained in further detail below.

Further, and as illustrated by FIG. 1B, the temperature of the battery 124 may change by a lesser amount than the battery would change if preconditioned from a fixed time interval from the destination charging station 116. In this regard, the chart 180 shows a baseline preconditioning time $t_b$, which indicates a fixed time interval from the destination charging station 116. In other words, the vehicle 120 can have a default behavior of starting preconditioning at a fixed time interval before reaching a charging station 116, such as the interval between time $t_b$ and time $t_n$, irrespective of the battery temperature or how much energy is needed to raise the temperature from the temperature at time $t_b$ to the preconditioning temperature 188. If the vehicle 120 initiates preconditioning at the baseline preconditioning time $t_b$, the battery temperature may follow a baseline preconditioning temperature curve 187b in order to reach the preconditioning temperature 188. In part because the temperature of the battery is lower at time $t_b$ as compared to time $t_r$, the curve 187b is both steeper and taller than the curve 187a, which indicates that preconditioning starting at time $t_b$ (and at its associated temperature) requires both a greater temperature change and a higher preconditioning intensity (i.e., higher power/energy expenditure) as compared to preconditioning starting at time $t_r$. Time $t_r$, which is determined based on the characteristics of the route, may therefore conserve system resource by preconditioning the leveraging the temperature of the battery induced by the specific features of the route r. In an example embodiment, preconditioning starting at time $t_b$ can require the vehicle 120 to artificially generate heat in the battery that raises the temperature in a manner following curve 187b. By comparison, preconditioning starting at time $t_r$ can require the vehicle 120 to avoid generating that heat and to instead predictively use waste heat while traveling to cause the battery temperature to follow curve 187a.

Figure 2:
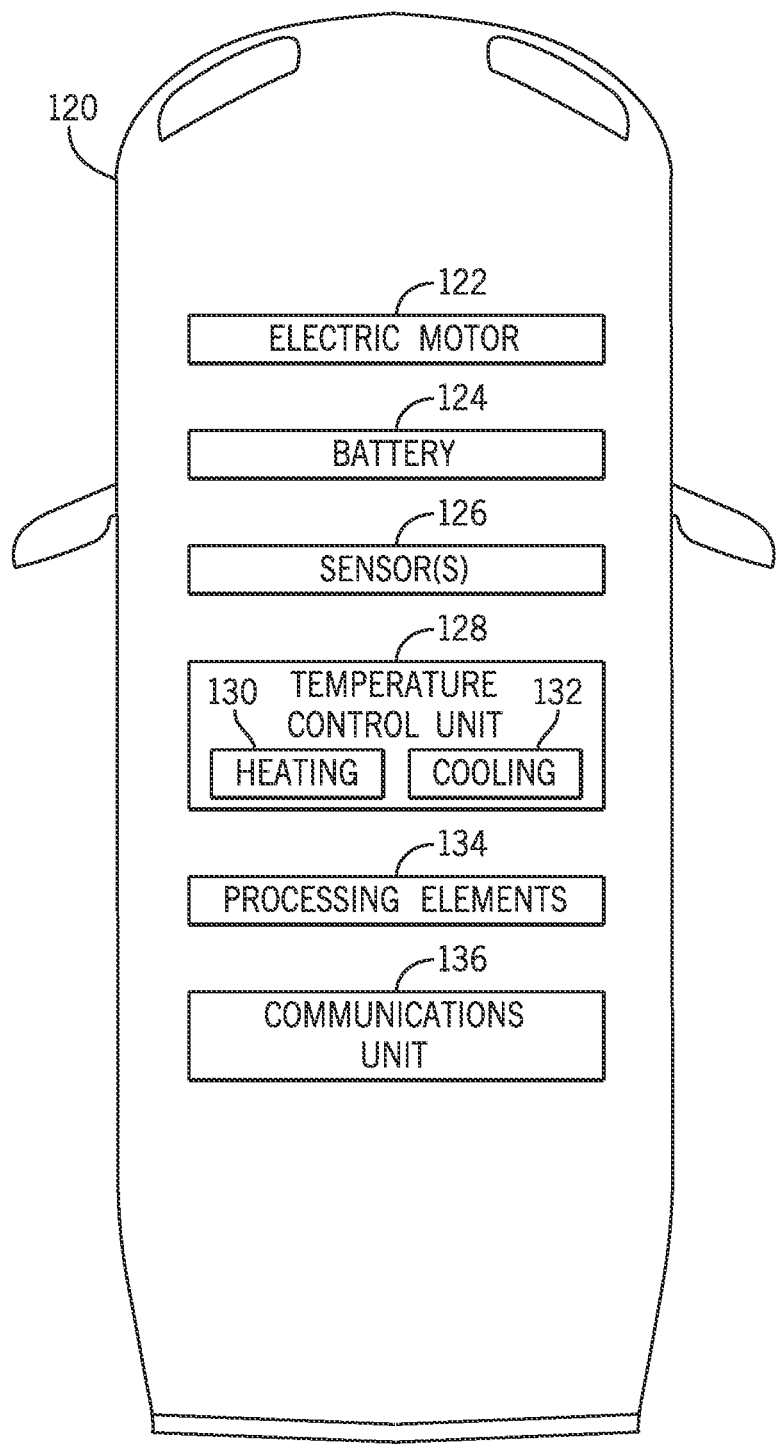
FIG. 2 depicts a functional diagram of a vehicle including an electric motor and a battery.

With reference to FIG. 2, the vehicle 120 is shown schematically. The vehicle 120 includes the battery 124, described above, which may be electrically connected to an electric motor 122. The electric motor 122 and the battery 124 may operate, among other functions, to provide propulsion to the vehicle 120 such that the vehicle 120 is capable of traversing the route r. Without limitation, the electric motor 122 and the battery 124 may be components of a plug-in electric vehicle or a hybrid electric vehicle, including vehicles which use, in addition to the components shown in FIG. 2, an internal combustion engine. The vehicle 120 is further shown including sensor(s) 126. The sensor(s) 126 may include a variety of instruments operable to determine one or more physical conditions of the electric motor 120, battery 124, and/or or various other component of the vehicle 120. For example, the sensor(s) 126 may include various temperature sensors, including thermocouples, thermistors, and resistance-based temperature detectors, among other instruments. In the present example, a temperature sensor may be configured to detect a temperature of the battery 124. In this regard, the temperature sensor may be used to determine a difference between the temperature of the battery 124 and one or more target temperatures, such as the preconditioning temperature 188 shown in FIG. 1B.

FIG. 2 further illustrates, schematically, a temperature control unit 128. The temperature control 128 may broadly be configured to alter a temperature of the battery 124. In this regard, the temperature control unit 128 may include a heating module 128 and a cooling module 130. The heating module 130 may include various components configured to increase a temperature of the battery 124, including but not limited to, certain resistive heating elements, heat traces, heat pumps, vents, heat exchangers, coolant pumps and associated routing channels, and so on. In some embodiments, the temperature control unit 128 can include a battery control unit configured to implement charge and discharge cycles in the battery 124 that are configured to increase the internal temperature of the battery 124 by usage and energy expenditure of the battery and its associated heat generation rather than by the battery 124 being acted upon (e.g., heated by) another component of the vehicle 120. In some embodiments, the heating module 130 can include a charging controller for the battery 124 configured to charge the battery (thereby increasing its temperature) using a regenerative braking system of the vehicle 120. The heating module 130 can thereby control the provision of heat to the battery 124 (e.g., increasing heat provided while preconditioning) by providing more charge to the battery using the regenerative braking system than would normally be provided if the battery 124 was not being preconditioned.

The cooling module 132 may include various components configured to decrease a temperature of the battery 124, including but not limited to certain fans, chillers, heat sinks, diffusers, heat exchangers, vents, heat pumps, radiators, coolant pumps and associated routing channels, and so on. The cooling module 132 components can be operated to lower the temperature of the battery 124 or to limit the rate at which the battery temperature rises in anticipation of keeping the battery temperature at the preconditioning temperature 188 upon arrival at the charging station 116 or at the time charging is expected to start. In certain cases, the temperature control unit 128 may operate in response to an input or measurement from the sensor(s) 126. For example, the sensor(s) may detect a battery temperature and the temperature control 128 may initiate an operation to increase or decrease a temperature of the battery 124 as needed for a given application.

The foregoing operations of the vehicle 120 may be facilitated by processing element(s) 134 and a communications unit 136. The processing elements(s) 134 may include one or more computer processors or microcontrollers that are configured to perform operations in response to computer-readable instructions. The processing elements(s) 134 may be a central processing unit of the vehicle 120. Additionally or alternatively, the processing elements(s) 134 may be other processors within the device including application specific integrated chips (ASIC) and other microcontroller devices. For example, the processing element(s) 134 may include or consist of elements of the computer system 1000 described herein in relation to FIG. 10.

The vehicle 120 may also include a communications unit 136 that is configured to transmit and/or receive signals or electrical communications from an external or separate device. For example, the communications unit 136 may be, or be coupled with, a BLUETOOTH® transmitter, receiver, or transceiver (or similar device) that operates to send and receive signals such as an ultra-low power BLUETOOTH LOW ENERGY (BLE) module. In other cases, other BLUETOOTH modules may be used. Additionally or alternatively, the communications unit 136 may employ other or additional techniques to facilitate sending and receiving signals such as, but not limited to, radio transmissions, Ethernet, Wi-Fi, local area network, ZIGBEE®, wide area network (WAN), and so on.

Figure 3:
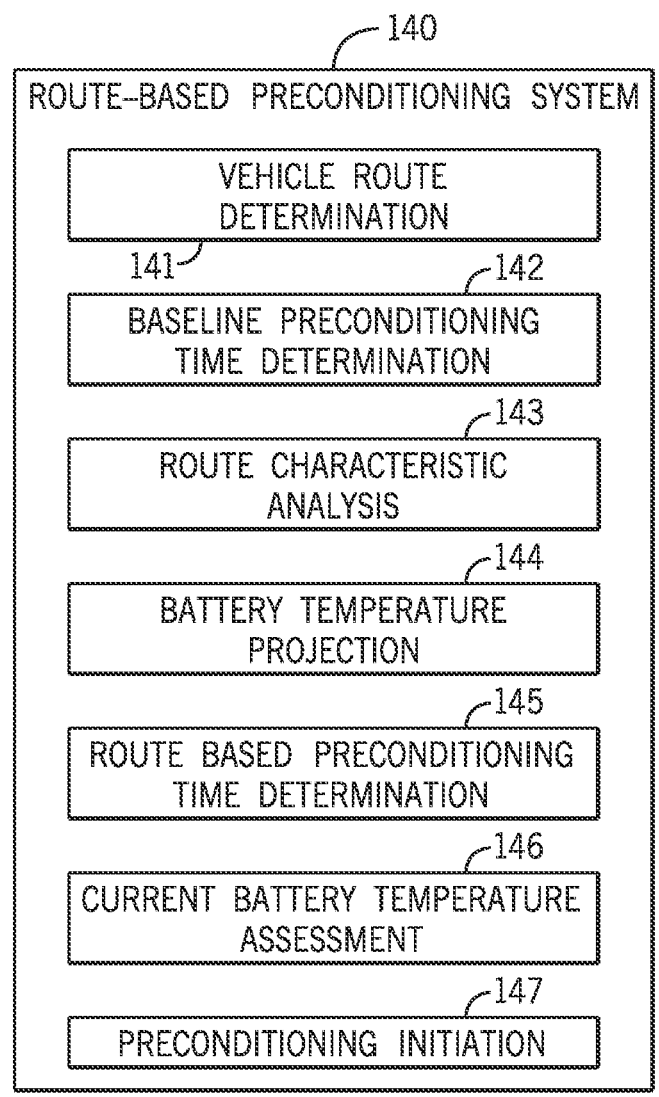
FIG. 3 depicts a functional diagram of a route-based preconditioning system.

FIG. 3 depicts a functional diagram of a route-based preconditioning system 140. The route-based preconditioning system 140 may include a collection of functional modules that cooperate to carry out the techniques described herein. For example, the system 140 may broadly be configured to analyze the route r of the vehicle 124 to the destination charging station 116 in order to determine one or more characteristics of the route r, such as characteristics that influence battery temperature. The system 140 may further be configured to determine a route-based precondition start time (e.g., $t_r$ of FIG. 2) based on the determined characteristics of the route r. The system 140 may operate in the vehicle, e.g., using the processing element(s) 134 and/or with an external computing device, such as that which may be represented by the computing device 1000 of FIG. 10.

As shown in FIG. 3, the system 140 include a vehicle route determination module 141. The vehicle route determination module 141 may be configured to select or propose a route of travel for an electric vehicle to reach a destination charging station. For example, and with reference to FIG. 1, the vehicle route determination module 141 may define the first road 104a as the route r for the vehicle 120 to reach the destination charging station 116. Navigation equipment, as described above, may be used to propose the first road 104a based on travel time or other factors. The route r itself may also be chosen based on preconditioning factors, the predicted preconditioning intensity, and the amount of preconditioning required for the route, among various other variables and factors, as described herein. The system 140 may further include a baseline precondition time determination module 142. The baseline precondition time determination module 142 may operate (if present) to set a baseline time for preconditioning of the battery 124. For example, the baseline preconditioning time determination module 142 may set a time for preconditioning in the absence of an analysis of the route r. The systems and techniques of the present disclosure may operate to analyze the route r in order to determine and implement a more efficient preconditioning start time as compared to the baseline preconditioning start time.

For example, FIG. 3 shows the system 140 including a route characteristic analysis module 143. As described in greater below with reference to FIG. 4, the route characteristic analysis module 143 may generally operate to determine one or more characteristics of the route that influence the temperature of the battery 124. Primary and secondary factors may be analyzed in order to determine an anticipated change in the temperature of the battery 124 over the course of the route r. Using the anticipated change in temperature of the battery 124 over the course of the route r, a battery temperature projection module 144 may operate to project a temperature of the battery 124 along the route r. In some cases, the route characteristic analysis module 143 and the battery temperature projection module 144 may cooperate to define an iterative process in which the anticipated change in temperature of the battery 124 is continually updated based on new information and insights pertaining to the route (e.g., a new development in traffic patterns, weather, vehicle resource usage, driving patterns, and so on).

FIG. 3 further shows the system 140 including a route-based preconditioning time determination module 145. The route-based preconditioning time determination module 145 may operate to compare the projected battery temperature of a target preconditioning battery in order to determine the preconditioning start time based on a variety of parameters. As one example, the preconditioning start time may be a time at which the projected route-based battery temperature has a value within a threshold range of the target preconditioning battery temperature. The threshold range may indicate, for example, that the battery temperature is closer in value to the target preconditioning battery temperature than the battery will be later along the route, thus indicating that initiating preconditioning at such time may be more efficient and/or less time consuming. In other cases, other parameters may be used to determine the preconditioning start time, including parameters related to preconditioning intensity, anticipated terrain, wait time or queue at the destination charging station, and/or other conditions or parameters.

The system 140 may in turn monitor a current temperature of the battery 124, for example, using a current battery temperature assessment module 146 as well as a time and place of the vehicle 120 along the route r. The current battery temperature assessment module 146 may provide information indicative of the state of the battery, including current temperature of one or more battery modules or cells of the battery. This may allow the predicted conditions of the battery to be updated periodically with actual battery performance data. In this regard, the route-based preconditioning time determination module 145 may update the determined route-based preconditioning time to reflect present conditions. At the appropriate battery temperature and/or time, a preconditioning initiation module 147 of the system 140 may initiate a process of changing a temperature of the battery 124 to reach the preconditioning temperature 188. For example, the preconditioning initiating module 147 may cause, in cooperation with the processing element(s) 134, the temperature control unit 128 to heat or cool the battery 124 as needed to reach a desired temperature starting at the preconditioning time determined by module 145.

Figure 4:
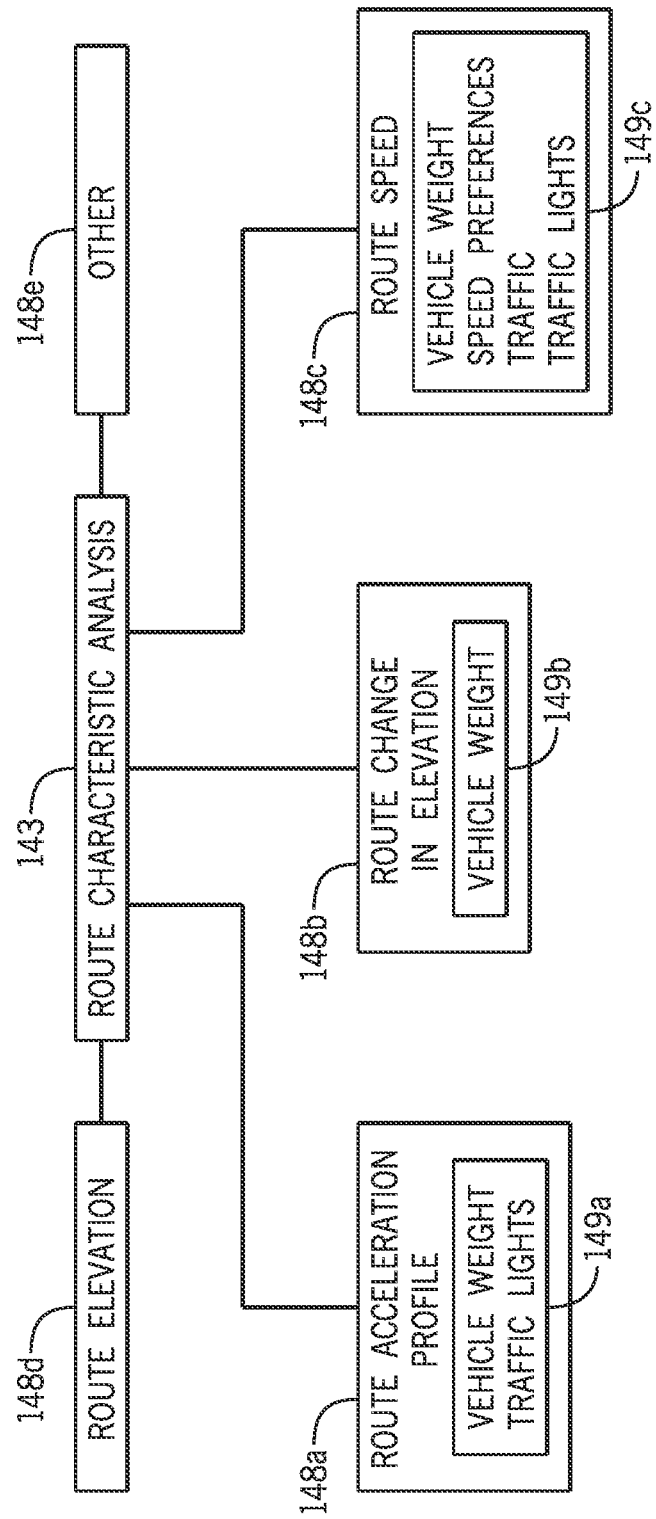
FIG. 4 depicts a block diagram of the route characteristic analysis module of FIG. 3.

With reference to FIG. 4, the route characteristic analysis module 143 is presented in greater detail. As described herein, the system 140 may be operable to analyze the route r of the vehicle 124 to the charging station 116 in order to determine a route characteristic. The route characteristic may include one or more projected conditions of the route that, when present, modify a current temperature of the battery. FIG. 4 shows some example projected conditions, including a route acceleration profile 148a, a route change in elevation 148b, a route speed 148c, a route elevation 148d, and an "other" condition 148e. The conditions 148a-148e may define a collection of primary factors. A value for particular factors of the collection of primary factors may depend, in part, on one or more secondary factors. For purposes of illustration, the route acceleration profile 148a is shown as being influenced by secondary factor 149a, including vehicle weight and traffic lights (e.g., a weight of the vehicle 120 and/or the presence, density, and so on of traffic lights 110 of FIG. 1A), among other possible secondary factors. Further, the route's change (or changes) in elevation 148b is shown as being influenced by secondary factors 149b, such as vehicle weight, an amount of anticipated regenerative braking (e.g., along downhill routes), weather patterns and temperature patterns influenced by elevation, and so on. Further, the route speed 148c is shown as being influenced by secondary factors 149c, including vehicle weight, user speed preferences (e.g., cruise control, other automatic driving control settings, historical speed and acceleration patterns for a particular driver), vehicle or other obstacle traffic, and traffic control conditions such as traffic lights, stop signs, speed bumps, etc.

The various primary factors and influencing secondary factors are presented in further detail below. It will be appreciated that the various factors are present for purposes of illustration. In other cases, more or fewer or different combinations of factors may be present and may influence the temperature of the battery in a variety of different ways.

With reference to route acceleration 148a, energy consumption may be related to vehicle speed. A vehicle that will be accelerating onto a highway two minutes before charging, for example, may warm up its battery, and therefore may require less preconditioning thereafter (e.g., as may be the case where the target battery temperature is higher than a current temperature of the battery). Deceleration, for regenerative braking-enabled vehicles, may also warm up the battery and can therefore require less expenditure of preconditioning energy thereafter. Predicted acceleration/deceleration zones (e.g. highway on ramps, highway exits) may also be taken into account to develop an expected battery temperature at each point along the route.

With reference to route change in elevation 148b, change in elevation along the route may also influence battery temperature. Consider a situation in which a vehicle is driving down a mountain and the charging facility is at the base. The vehicle 120 may naturally coast and may not necessarily use its battery as much for acceleration or maintaining its speed. As a corollary, a vehicle that drives up a mountain to the charging facility may use the battery 124 more, warming up the battery 124 and affecting preconditioning timing. In this regard, the vehicle 124 may use the future, planned route's changes in elevation as a factor for preconditioning.

With reference to route speed 148c, energy consumption may be exponentially related to vehicle speed. Where the vehicle 120 is driving on a highway, for example, the vehicle 120 may be consuming exponentially more energy (and thus warm its battery at a faster rate) than when the vehicle 120 relatively slowly drives through a neighborhood. In the event the vehicle 120 requires a warmer battery, the vehicle 120 on the highway therefore could begin preconditioning at a later time, or could precondition at a lesser intensity as compared to the vehicle 120 preconditioning starting from a neighborhood drive. The different miles-per-hour (MPH)/speed zones along the planned route may therefore be taken into account when determining when and how intensely to precondition the battery.

With reference to route elevation 148d, consider a situation in which the vehicle 120 can take a high elevation mountainous route or a flat, sea-level route. If the vehicle 124 decides to take the high elevation route, the ambient temperature will likely be lower than for the flat route, therefore affecting the timing of preconditioning due to the battery likely dropping in temperature more quickly than a vehicle in an area with higher ambient air temperatures. This elevation factor 148d is different from taking a current ambient temperature reading (e.g., using an onboard sensor) as a factor for preconditioning because the vehicle 124 can use the future, planned route's elevation over time as a predictor of future ambient temperature (and thus the route's impact on battery temperature), even when the actual temperature of the route is unknown. Thus, the ambient temperature at points along the route can be estimated at least partially based on route elevation at those points.

With reference to "other" factor 148e, various other conditions, circumstances, and conditions may be analyzed along the route r in that may influence the precondition of the battery 124. As one example, the other factor 148e may include analyzed route characteristics based on a comparison of two or more route types. For example, two or more routes may each allow the vehicle 124 to arrive at the destination charging station 116. The analysis module 143 may be configured to determine the route characteristics for each separate route and allow for a selection of a route based on the route having more desirable preconditioning timing or preconditioning energy efficiency.

As one example, a route choice based on routing-battery temperature may be modeled using the route characteristic analysis module 143. For example, the vehicle 120 (having a battery temperature lower than an optimal charging temperature) can have two potential routes to the destination charging station 116. Both routes may take a roughly equivalent amount of time to reach the station 116; one, however, features a large hill while the other is relatively flat. A conventional system may randomly choose between the routes and/or choose the flat route to reduce battery consumption. However, using techniques and methods described herein, the vehicle 124 may analyze both routes and determine that the hilly route will automatically raise battery temperature to optimal levels for preconditioning in a manner that is more battery-energy-efficient than using normal preconditioning methods, so the unintuitive hilly route can be chosen instead.

As another example, a vehicle may have around 20 minutes to the charging station, at which time the battery of the vehicle is around 20 degrees below the target preconditioning temperature it will need to have when it reaches the charging station. A conventional system may identify the foregoing pieces of information and begin preconditioning the battery without specific reference to the route (or associated route-based factors) the vehicle anticipates traveling to reach the charging station. Using the systems and techniques described herein, however, the route is analyzed in order to determine the preconditioning start time based, in part, on the predicted impact of the upcoming route on the battery temperature. For example, the systems and techniques described herein may be used to predict a large mountain right before the charging station. Traveling over the large mountain may be understood to induce an increased temperature of the battery, and thus fairly little direct preconditioning may be required to reach the target preconditioning temperature. In this regard, the systems and techniques described herein may allow the battery to reach the target preconditioning temperature without overshooting the target temperature. In contrast, the conventional systems may heat the battery while the battery also is imparted with heat from traversing the mountain. The conventional systems may therefore be less efficient, and may in fact require the battery to be cooled after the uphill climb, wasting energy.

As another example, routing-time factors may be considered, such as the traversal time associated with the route, including time from traffic, stop signs, speed zones, and so on. For example, the same hilly route—although consuming slightly more battery (e.g., consuming 1% state of charge)—is 2 minutes faster than the flatter route, and while charging those 2 minutes at optimal battery temperature may bring the battery levels above (e.g. +3% state of charge) those of a car that lost the 2 minutes taking the flatter route at suboptimal battery temperature. The foregoing example, for purpose of non-limiting illustration, may apply to a particularly short trip of the vehicle. For example, the trip may be short such that the heating or cooling system of the vehicle may not necessarily optimize battery temperature using the system for the flatter route.

Figure 5:
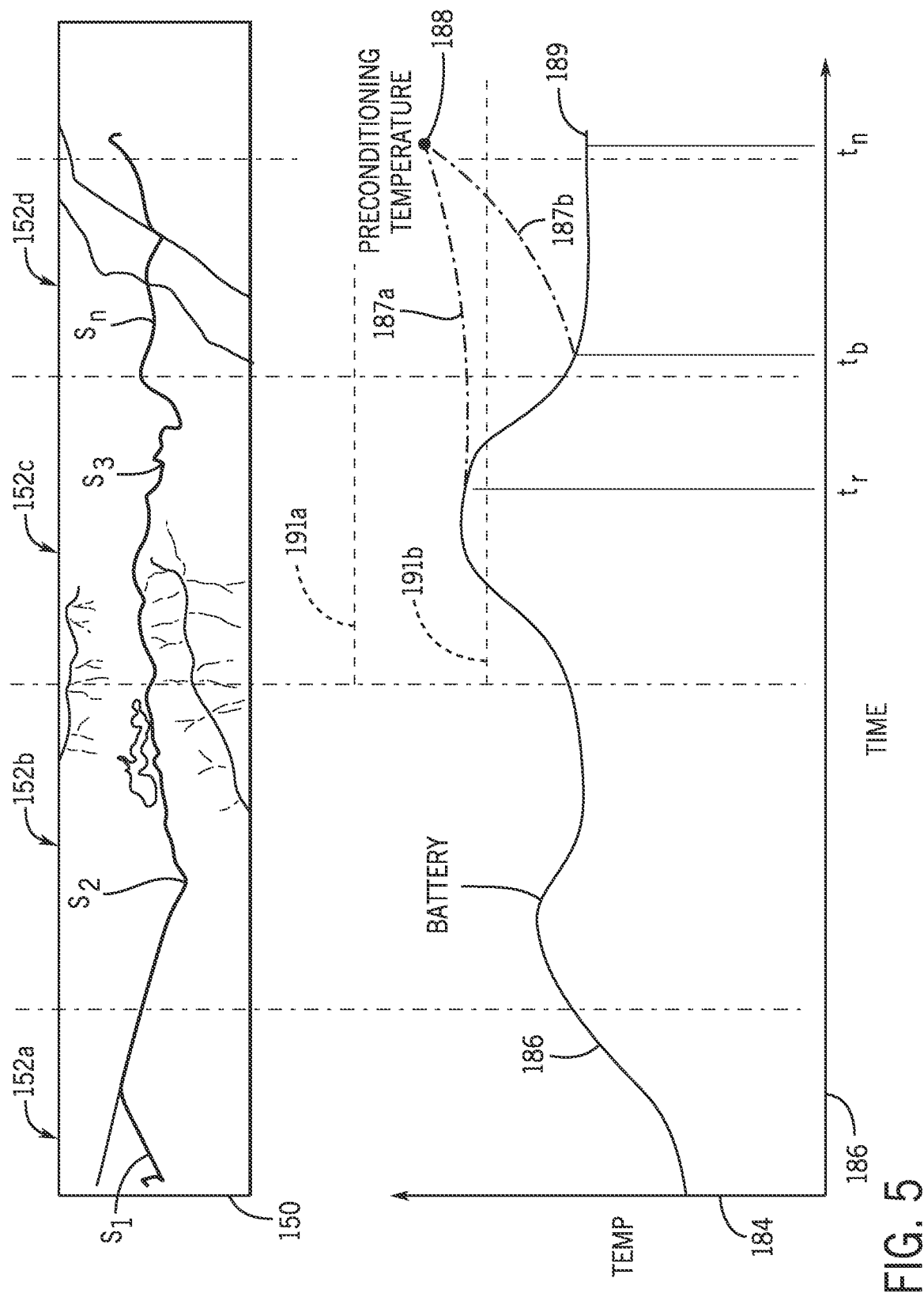
FIG. 5 depicts a sample chart representing a battery temperature of a vehicle battery with respect to route segments of a route.

The route-based preconditioning system 140 may be configured to analyze the characteristics of the route with respect to particular segments of the route r. For example, the route characteristic analysis module 143 may determine a temperature impact for each of the factors 148a-148e for a given segment of the route r. The temperature impact for each segment of the route may be combined in order to determine a total predicted temperature impact from the route characteristic. This in turn may be used to project a temperature of the battery 124 along the route r. For example, and as shown in FIG. 5, a geographic representation 150 of the route r is shown relative to the change 180, described above with reference to FIG. 1B; redundant explanation of which is omitted here for clarity. The geographic representation 150 may be divided into zones in order to define route segments, serially along the route r. The geographical representation 150 is shown as including a first geographic zone 152a associated with a first route segment $s_1$, a second graphic zone 152b associated with a second route segment $s_2$, a third geographic zone 152c associated with a third route segment $s_3$, and fourth geographic zone 152d associated with a fourth route segment $s_n$.

Each of the geographic zones 152a-152d may be associated with one or more of primary factors and secondary factors, as described herein. A factor for a given zone may produce a different temperature impact as compared with another zone. As one example, route change in elevation may produce a negligible impact on temperature in a first zone, whereas in another zone the impact is significant. By analyzing the temperature impact for each factor for each zone, a more precise projection of the battery temperature may be produced. For example, the curve 186 may be produced by analyzing the temperature impact of the factors, as appropriate, and as present, for each of the zones 152a-15d and corresponding segments $s_1$-$s_n$.

Figure 6:
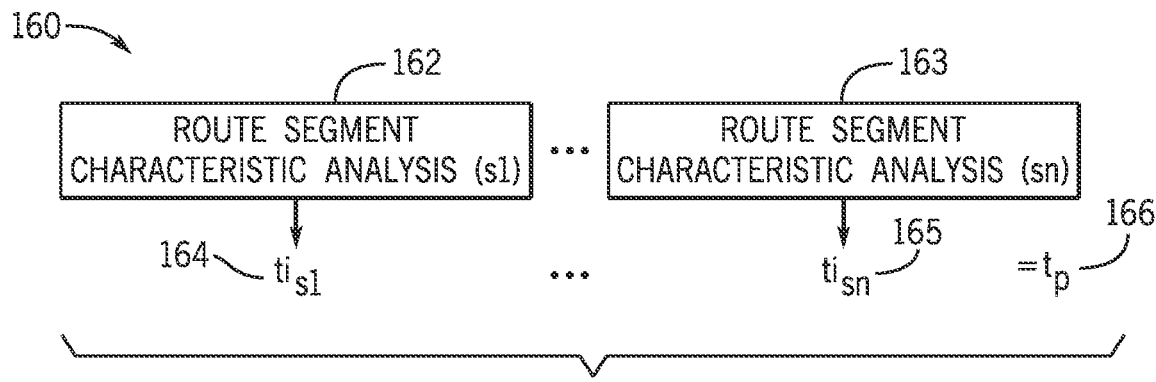
FIG. 6 depicts a block diagram of a route segment characteristic analysis module.

To illustrate the foregoing analysis, FIG. 6 shows a block diagram 160. The block diagram 600 shows that a route segment characteristic analysis may be performed for each segment of the route r. For example, the analysis described with respect to FIG. 4 may be performed for one or more or all of the segments shown in geographic representation. The cumulative temperature impact may then be determined across all segments in order to produce the projected temperature curve 186 shown in FIGS. 1B and 5. To illustrate the foregoing, FIG. 6 shows the block diagram 600 include a first route segment characteristic analysis 162. The first route segment characteristic analysis 162 may perform the analysis described with respect to the route characteristic analysis module 143 with respect to the first route segment $s_1$; redundant explanation of which is omitted here for clarity. The result of this analysis may be a first segment temperature impact $t_{is1}$ 164, which is indicative of the temperature impact on the battery 124 based on the characteristics of the first route segment. The block diagram 600 further include a second route segment characteristic analysis 163. The second route segment characteristic analysis 163 also may perform the analysis described with respect to the route characteristic analysis module 143 with respect to the fourth route segment $s_n$. The result of this analysis may be another segment temperature impact $t_{isn}$ 166, which is indicative of the temperature impact on the battery 124 based on the characteristics of the fourth route segment. It will be appreciated that additional analysis may be performed to determine the temperature impact of additional segments. A cumulative total of the impacts may be represented by temperature prediction $t_p$ 166.

Figure 7:
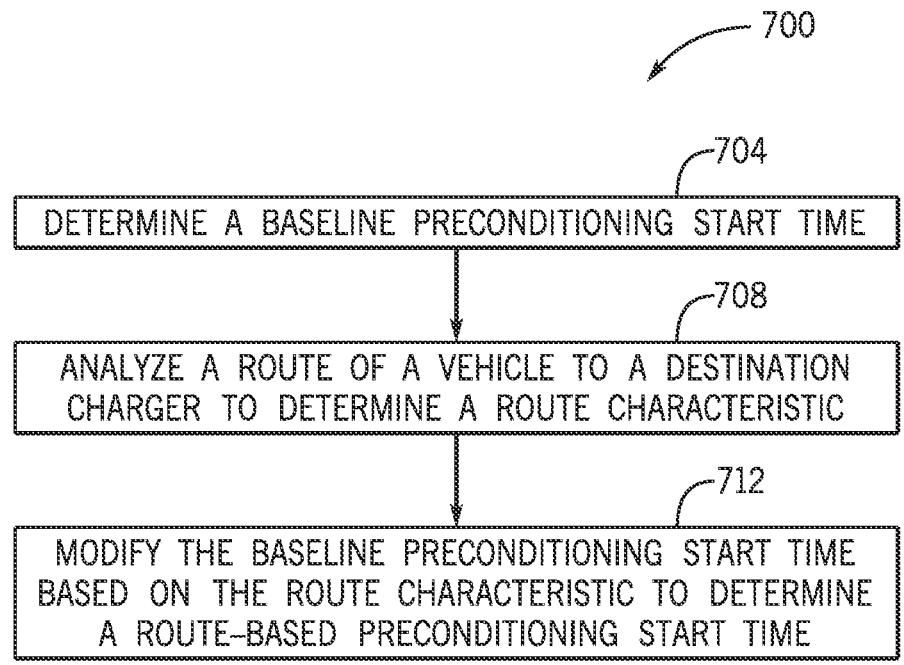
FIG. 7 depicts a flow diagram for preconditioning a battery of a vehicle, according to implementations of the present disclosure.
Figure 8:
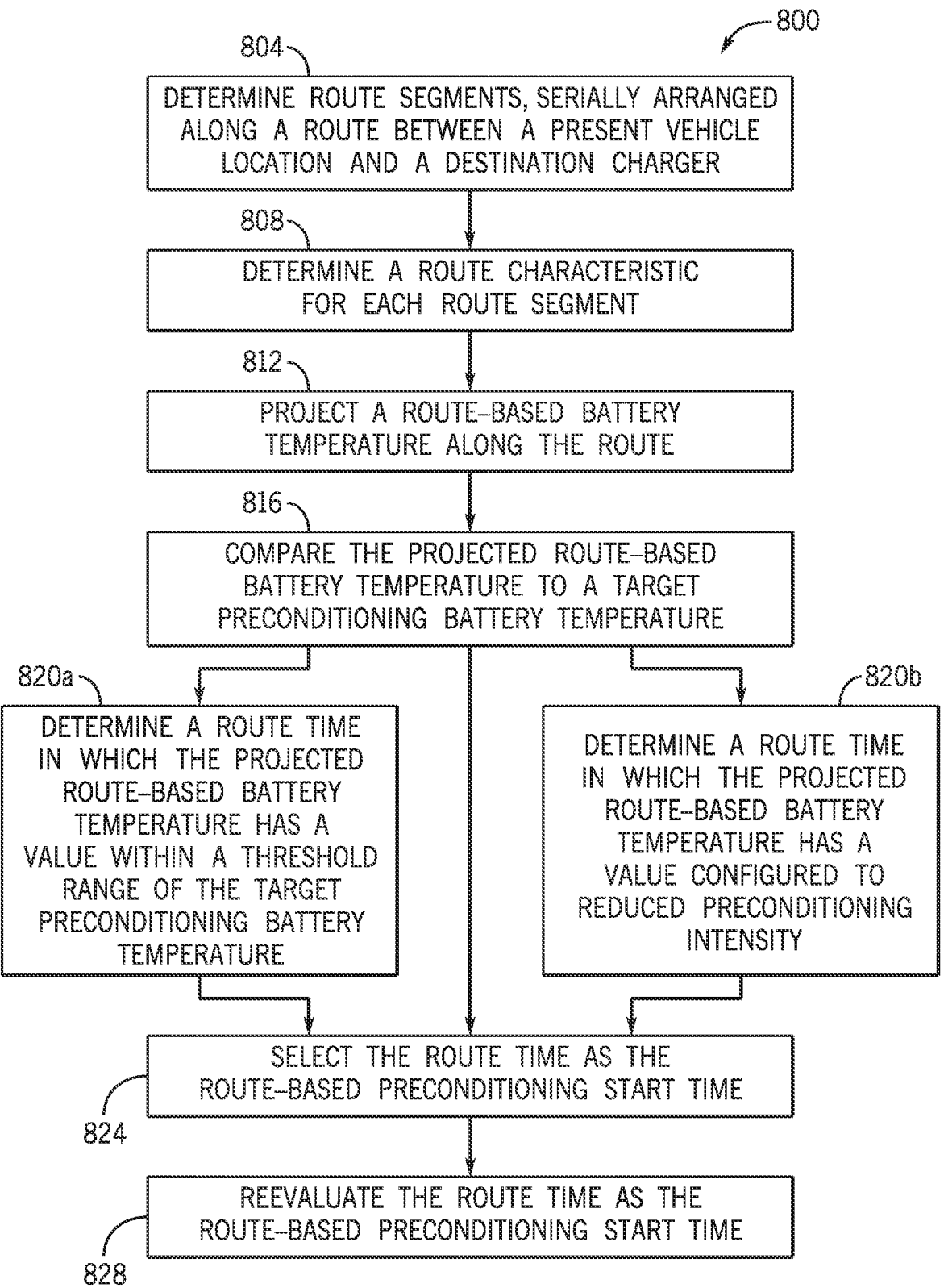
FIG. 8 depicts a flow diagram for preconditioning a battery of a vehicle, according to implementations of the present disclosure.
Figure 9:
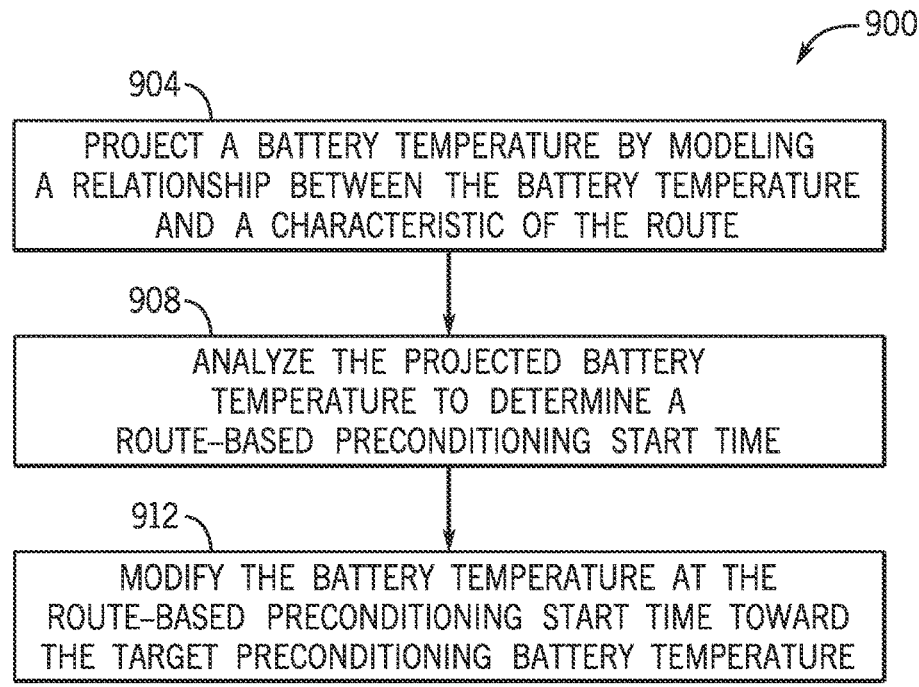
FIG. 9 depicts a flow diagram for preconditioning a battery of a vehicle, according to implementations of the present disclosure.

To facilitate the reader's understanding of the various functionalities of the embodiments discussed herein, reference is now made to the flow diagrams of FIGS. 7, 8, 9, which illustrate processes 700, 800, 900. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 7, a method of preconditioning a battery is disclosed. At operation 704, a baseline preconditioning start time is determined. For example, and with reference to FIGS. 1B and 3, the baseline precondition time determination module 142 may determine the baseline preconditioning start time $t_b$. The baseline preconditioning start time $t_b$ may correspond to a fixed interval for preconditioning prior to arrival at the destination charting station 116. At operation 708, a route of a vehicle to a charging station is analyzed to determine a route characteristic. For example, and with reference to FIGS. 3 and 4, the route characteristic analysis module 143 may analyze the route r to determine the temperature impact from one or more conditions along the route. For example, and as described herein, the route characteristic analysis module 143 may determine a temperature impact from one or more of the primary factors 148a-148e along the route r. At operation 712, the baseline preconditioning start time is modified based on the route characteristic to determine a route-based preconditioning start time. For example, and with reference to FIGS. 1B and 3, the route-based preconditioning time determination module 145 may determine a preconditioning start time $t_r$ based on the characteristics of the route r. For example, the route-based preconditioning start determination module 145 may determine the preconditioning start time $t_r$ at the value shown in FIG. 1B in order to define the preconditioning curve 187a indicative of a lesser change in temperature (and lesser preconditioning intensity) to reach the preconditioning temperature 188.

With reference to FIG. 8, a method of analyzing a route of an electric vehicle is disclosed. At operation 804, route segments are determined serially arranged along a route between a present vehicle location and a charging station. For example, and with reference to FIG. 5, the route r may be analyzed to determine the first route segment $s_1$, the second route segment $s_2$, the third route segment $s_3$, and the fourth route segment $s_n$ (and more, if needed). The segments can be defined based on distance along the route (e.g., equal-distance segments), divisions based on the time needed to pass through each segment (e.g., equal-time segments), a predetermined number of segments (e.g., predetermined segment quantity, which, if set low, can accelerate or simplify calculation time and energy at the cost of precision, or, if set high, can increase precision at the cost of calculation time and energy), and so on. The route segments $s_1$-$s_n$ may be serially arranged along the route r. In some cases, the route segments may additionally or alternatively be defined based on route characteristics, e.g., roadway-type-based segments (such as a highway segment, a neighborhood segment, a mountainous segment, a coastal sea-level segment, a circuitous segment, a straight segment, etc.), traffic-based segments, elevation-based segments, similar segments, and combinations thereof. At operation 808, a route characteristic is determined for each route segment. For example, and with reference to FIGS. 4 and 6, a temperature impact for each segment may be determined by analyzing the characteristics of the route, for example, such as determining the first segment temperature impact $t_{is1}$ 164, and so on to determine a cumulative temperature impact for each segment along the route r.

At operation 812, a route-based battery temperature is projected along the route. For example, and with reference to FIGS. 5 and 6, the curve 186 may be indicative of a projected temperature of the battery 124 along the route r. In some embodiments, a single representative battery temperature (e.g., average temperature) can be assigned to each segment. The curve 186 may be generated, in part, by plotting the temperature impact for each of the segments $s_1$-$s_n$ as a function of time. At operation 816, the projected route-based battery temperature is compared to a target preconditioning battery temperature. For example, and with reference to FIG. 5, the curve 186 may be compared to the target preconditioning temperature 188. The comparison of operation 816 may be used to determine a difference between the battery temperature represented by the curve 186 and the target preconditioning battery temperature 188.

In this regard, at operations 820a and 820b, route times may be selected to optimize battery preconditioning. For example, method 800 may include the operation 820 in which a route time is determined in which the projected route-based battery temperature has a value within a threshold range of the target preconditioning battery temperature. For example, and with reference to FIG. 5, the route-based preconditioning start time $t_r$ may be determined based on the proximity of the projected battery temperature as represented by the curve 186 to the target precondition temperature 188. With further reference to FIG. 5, the route-based preconditioning temperature start time $t_r$ may be determined based on the curve 186 being within a threshold defined by an upper bound 191a and a lower bound 191b. The upper bound 191a and the lower bound 191b may be defined, in some examples, as a predetermined deviation from the target preconditioning temperature 188, such as where the upper bound 191a has a value of around 10% above the target preconditioning temperature 188 and the lower bound 191b has a value of around 10% below the target preconditioning temperature 188. In other cases, other ranges may be defined. Selecting the route-based preconditioning temperature start time $t_r$ at a value for the temperature curve 186 being within the threshold range may help reduce preconditioning intensity or otherwise conserve energy. To illustrate, at operation 820b, a route time is determined in which the projected route-based battery temperature has a value configured to reduce preconditioning intensity. For example, and with reference to FIG. 5, the route-based preconditioning start time $t_r$ may be determined based on an intensity of resource usage to modify the battery temperature to the target precondition battery temperature 188. At operation 824, the route time is selected as the preconditioning start time. For example, and with reference to FIGS. 5 and 2, the vehicle 120 may initiate a precondition operation for the vehicle 120 using the temperature control unit 128 at the indicated time. At operation 828, the route time is reevaluated with respect to the preconditioning start time. As one example, as the vehicle traverses the route, the vehicle may periodically again perform any of the operations of method 800 described above. In this regard, the preconditioning start time may be updated as the vehicle traverses the route to account for new conditions, e.g., traffic, a change in temperature, a change in weather, a change in roadway traveled, a change in charging station availability, and so on.

With reference to FIG. 9, another method of preconditioning a battery is shown. At operation 904, a battery temperature is projected by modeling a relationship between the battery temperature and a characteristic of the route. For example, and with reference to FIG. 5, the curve 186 may represent a model of the projected relationship between the battery temperature and one or more characteristics of the route r. The curve 186 may reflect the temperature impact of one or more factors for each of the route segments $s_1$-$s_n$. At operation 908, the projected battery temperature is analyzed to determine a route-based precondition start time. For example, and with reference to FIGS. 3 and 5, the route-based preconditioning time determination module 145 may determine the precondition start time $t_r$ based on the analyzed characteristics of the route r and the proximity of the projected battery temperature to the target preconditioning battery temperature 188. At operation 912, the battery temperature is modified starting at the route-based preconditioning start time to change (i.e., increase or decrease) toward the target preconditioning battery temperature. For example, and with reference to FIG. 2, the temperature control unit 128 may begin to modify the temperature of the battery 122 at the determined precondition start time tr.

Figure 10:
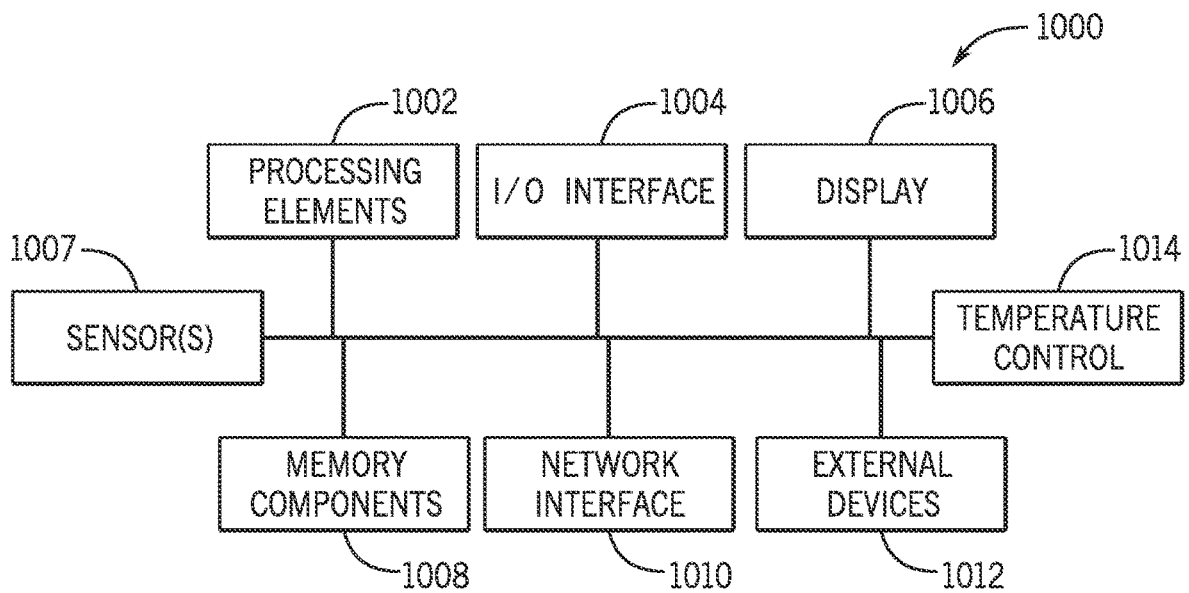
FIG. 10 depicts an example schematic diagram of a computer system for implementing various techniques in the examples described herein.

FIG. 10 depicts an example schematic diagram of a computer system 1000 for implementing various techniques in the examples described herein. A computer system 1000 may be used to implement the route-based preconditioning system 140 (in FIG. 3) or can be integrated into one or more components of the vehicle 120 or other system, which may be remote from the vehicle 120. More generally, the computer system 1000 is used to implement or execute one or more of the components or operations disclosed in FIGS. 1-9. In FIG. 10, the computer system 1000 may include one or more processing elements 1002, an input/output interface 1004, a display 1006, sensor(s) 1007, one or more memory components 1008, a network interface 1010, one or more external devices 1012, and a temperature control unit 1014. Each of the various components may be in communication with one another through one or more buses, communication networks, such as wired or wireless networks.

The processing element 1002 may be any type of electronic device capable of processing, receiving, and/or transmitting instructions. For example, the processing element 1002 may be a central processing unit, microprocessor, processor, or microcontroller. Additionally, it should be noted that some components of the computer 1000 may be controlled by a first processor and other components may be controlled by a second processor, where the first and second processors may or may not be in communication with each other.

The memory components 1008 are used by the computer 1000 to store instructions for the processing element 1002, as well as store data, such as data from the route or associated temperature impacts (FIG. 5) and the like. The memory components 1008 may be, for example, magneto-optical storage, read-only memory, random access memory, erasable programmable memory, flash memory, or a combination of one or more types of memory components.

The display 1006 provides visual feedback to a user. Optionally, the display 1006 may act as an input element to enable a user to control, manipulate, and calibrate various components of the route-based precondition system 140 or vehicle 120. The display 1006 may be a liquid crystal display, plasma display, organic light-emitting diode display, and/or other suitable display. In embodiments where the display 1006 is used as an input, the display may include one or more touch or input sensors, such as capacitive touch sensors, a resistive grid, or the like.

The I/O interface 1004 allows a user to enter data into the computer 1000, as well as provides an input/output for the computer 1000 to communicate with other devices or services. The I/O interface 1004 can include one or more input buttons, touch pads, and so on.

The computer 1000 may also include one or more sensors 1007 that may be used to detect a touch and/or force input, environmental condition, orientation, position, or some other aspect of the computer 1000. In this regard, the sensors 1007 may be used to detect an input at a touch-sensitive display (e.g., display 1006) and/or other surface or feature, such as an external surface of the computer device 1000 defined by an outer enclosure or shell. Example sensors 1007 include, without limitation, one or more accelerometers, gyrometers, inclinometers, goniometers, or magnetometers. The sensors 1007 may also include one or more proximity sensors, such as a magnetic hall-effect sensor, inductive sensor, capacitive sensor, continuity sensor, or the like. Resistive and contact-based sensors may also be used.

The network interface 1010 provides communication to and from the computer 1000 to other devices. The network interface 1010 includes one or more communication protocols, such as, but not limited to WiFi, Ethernet, Bluetooth, and so on. The network interface 1010 may also include one or more hardwired components, such as a Universal Serial Bus (USB) cable, or the like. The configuration of the network interface 1010 depends on the types of communication desired and may be modified to communicate via WiFi, Bluetooth, and so on. The external devices 1012 are one or more devices that can be used to provide various inputs to the computing device 1000, e.g., mouse, microphone, keyboard, trackpad, or the like.

The external devices 1012 may be local or remote and may vary as desired. In some examples, the external devices 1012 may also include one or more additional sensors. The temperature control device 1014 may be substantially analogous to the temperature control unit 128 of FIG. 2; redundant explanation of which is omitted here for clarity.

The foregoing description has a broad application. For example, while examples disclosed herein may focus on central communication system, it should be appreciated that the concepts disclosed herein may equally apply to other systems, such as a distributed, central or decentralized system, or a cloud system. For example, some components may reside on a server in a client/server system, on a user mobile device, or on any device on the network and operate in a decentralized manner. One or more components of the systems may also reside in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of preconditioning a battery of a vehicle, the method comprising:
    determining a baseline preconditioning start time relative to an estimated time of arrival at a charging station, wherein the baseline preconditioning start time is associated with a baseline preconditioning intensity;
    determining route segments, serially arranged along a route of the vehicle, between a present vehicle location and the charging station;
    analyzing the route of the vehicle to the charging station to determine a route characteristic for each route segment, wherein the route characteristic for each route segment corresponds to a projected temperature change of the battery along the respective route segment;
    projecting a route-based battery temperature of the battery along the route by calculating a change from a current battery temperature for each route segment based on the respective route characteristic;

determining a route-based preconditioning start time by determining a route time along the route in which the projected route-based battery temperature has a temperature value in which initiating a preconditioning operation for the battery at the route time is configured to reduce a preconditioning intensity relative to the baseline preconditioning intensity; and modifying the baseline preconditioning start time based on the route-based preconditioning start time.

2. The method of claim 1, wherein the route characteristic comprises one or more projected conditions of the route that, when present, modify a current temperature of the battery.

3. The method of claim 2, wherein the one or more projected conditions comprise:
a route elevation,
a change in the route elevation,
a route speed, or
a route acceleration profile.

4. The method of claim 2, wherein;
the one or more projected conditions define a collection of primary factors that, when present, modify the current temperature of the battery, and
analyzing the route further comprises determining a value for one or more primary factors of the collection of primary factors by analyzing a secondary factor that, when present, modifies the value of the one or of the primary factors.

5. The method of claim 4, wherein the secondary factor comprises:
a user speed preference,
a traffic condition metric,
a traffic light metric, or
a vehicle weight.

6. The method of claim 1, wherein determining the route-based preconditioning start time comprises:
comparing the projected route-based battery temperature to a target preconditioning battery temperature,
determining a route time in which the temperature value for the projected route-based battery temperature is within a threshold range of the target preconditioning battery temperature, and
selecting the route time as the route-based preconditioning start time.

7. A method of preconditioning a battery of an electric vehicle, the method comprising:
determining a baseline preconditioning start time for the battery on a route between a present vehicle location and a charging station, the baseline preconditioning start time corresponding to a baseline preconditioning intensity;
projecting a plurality of battery temperatures of the battery along a plurality of route segments of the route of the vehicle by modeling a relationship between the plurality of battery temperatures and a plurality of route characteristics of the plurality of route segments;
analyzing the projected plurality of battery temperatures to determine a route-based preconditioning start time, the route-based preconditioning start time being configured to reduce a preconditioning intensity of the battery relative to the baseline preconditioning intensity; and
modifying a battery temperature, at the route-based preconditioning start time, to reach a target preconditioning battery temperature.

8. The method of claim 7, wherein modeling the relationship between the plurality of battery temperatures and the plurality of route characteristics comprises estimating a temperature impact from one or more projected conditions of the route that, when present, modify a current temperature of the battery.

9. The method of claim 8, wherein projecting the plurality of battery temperatures further comprises extrapolating a route-based battery temperature along an entirety of the route from a current temperature of the battery based on the estimated temperature impact.

10. The method of claim 7, wherein;
projecting the plurality of battery temperatures further comprises:
determining a temperature impact for segments of the plurality of route segments, and
modeling the relationship between the plurality of battery temperatures and the temperature impact for the segments of the plurality of route segments.

11. The method of claim 10, wherein;
projecting the plurality of battery temperatures further comprises projecting a route-based battery temperature of the battery along the route by calculating a change from the current battery temperature for the plurality of route segments based on the determined temperature impact, and
analyzing the projected plurality of battery temperatures comprises:
comparing the projected plurality of battery temperatures to the target preconditioning battery temperature,
determining a route time at which the projected route-based battery temperature has a value within a threshold range of the target preconditioning battery temperature, and
selecting the route time as the route-based preconditioning start time.

12. The method of claim 7, wherein:
modifying the battery temperature comprises increasing or decreasing the battery temperature toward the target preconditioning battery temperature, and
the method further comprises modifying a preconditioning intensity associated with the increasing or decreasing of the battery temperature based on a comparison between a current temperature of the battery and an estimated time of arrival to charging station.

13. The method of claim 12, further comprising minimizing the preconditioning intensity by determining the route-based preconditioning start time as a time in which the current battery temperature is closest to the target preconditioning battery temperature.

14. A vehicle comprising:
an electric motor;
a battery electrically connected to the electric motor;
a sensor configured to detect a battery temperature of the battery;
at least one of a heating module or a cooling module, the heating module or the cooling module being configured to alter the battery temperature; and
a non-transitory computer-readable media encoded with instructions which, when executed by one or more processing elements of the vehicle, cause the vehicle to:
analyze a plurality of route segments of a route of the vehicle between a first vehicle location and a charging station location to determine a plurality of route characteristics, analyze the plurality of route characteristics to determine a route-based preconditioning start time configured to reduce a baseline preconditioning intensity of the vehicle, and modify the baseline preconditioning start time based on the route-based preconditioning start time.

15. The vehicle of claim 14, wherein the instructions further cause the vehicle to:

project a route-based battery temperature of the battery along the route of the vehicle by modeling a relationship between the battery temperature and the route characteristic, and determine the route-based preconditioning start time by:
analyzing the projected route-based battery temperature along the entire route, and
selecting a route time in which the projected route-based battery temperature has a value within a threshold range of a target preconditioning battery temperature.

16. The vehicle of claim 15, wherein the instructions further cause the vehicle to:

using the sensor, detect the battery temperature along the route, and compare the battery temperature to projected route-based battery temperature.

17. The vehicle of claim 16, wherein the instructions further cause the vehicle to selectively update the route-based preconditioning start time by reassessing whether the value of the projected route-based battery temperature as the selected route time remains within the threshold range of the target preconditioning battery temperature.

* * * * *